United States Patent Office 3,298,454
Patented Jan. 17, 1967

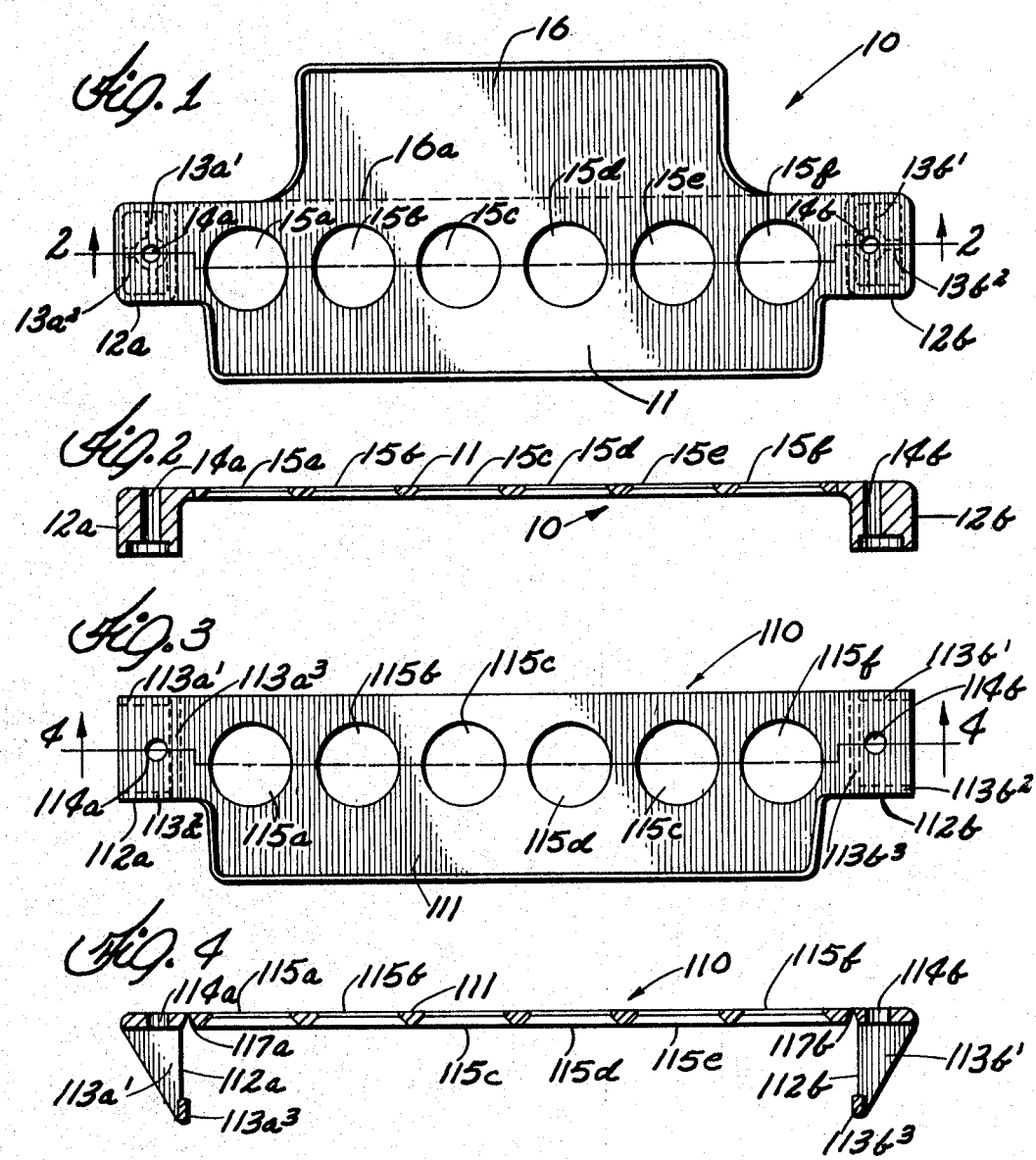

3,298,454
BATTERY HOLD-DOWN DEVICE
Walter Ernest Anderson, Milwaukee, and Roy Erving Hennen, Mequon, Wis., and John T. Redmon, Detroit, Mich., assignors to Globe-Union Inc., Milwaukee, Wis., a corporation of Delaware
Filed Jan. 19, 1965, Ser. No. 426,530
8 Claims. (Cl. 180—68.5)

The present invention relates to an improved battery hold-down device and, more specifically, to a device of this type which fits and binds storage batteries, such as used in automobiles, motor boats and the like, in place on their supports.

A primary object of the present invention is to provide a new and improved battery hold-down device. More specifically, an object is to provide a device of this type which fits and binds storage batteries, such as used in automobiles, motor boats and the like, in place on their supports.

Another object of the present invention is to provide a new and improved battery hold-down device formed of a non-corrosive material. A related object is to provide a new and improved battery hold-down device formed of a plastic material such as polypropylene. Accordingly, an object of the present invention is to provide such a hold-down device which eliminates corrosion resulting from water and electrolyte on the upper surface of the battery. In this connection, it is an object to provide such a device which eliminates short circuiting resulting from such corrosion and which substantially eliminates current leakage to ground.

A further object of the present invention is to provide a new and improved battery hold-down device which is designed to facilitate the mounting of the device and the securing of a battery to an associated support.

Still another object is to provide a new and improved battery hold-down device which is designed to prevent improper installation of a battery. A resulting object is to provide such a device which is designed to eliminate damage to the regulator system in a vehicle employing an alternator system that would result from improper installation of the battery in the ignition system of the vehicle.

A general object of the present invention is to provide a new and improved battery hold-down device characterized in its simplicity, compactness, sturdiness, and economy. Another general object is to provide such a device characterized in that it may be made eye appealing since it may be readily and inexpensively manufactured in various desired basic colors.

In one embodiment of the present invention, a battery hold-down device is provided which includes a main body portion adapted to engage the top of a battery and mounting extensions for cooperating with hold-down bolts on a battery support to secure the battery to the support. A plurality of apertures are formed in the main body portion which are adapted to be aligned with battery filler ports to align the device relative to the battery and the battery support. The device may be formed of a non-corrosive material which eliminates corrosion that commonly results from water and electrolyte on the upper surface of a battery. Further, the main body portion may be formed with a lateral extension which is adapted to extend between upstanding terminal posts to aid in aligning the device and upon which desired information may be imprinted, such as instructions as to proper battery installation.

Other objects and advantages of the present invention will become apparent upon reading the attached detailed description taken in connection with the accompanying drawing wherein:

FIGURE 1 is a top elevational view of a first embodiment of a battery hold-down device constructed in accordance with the teachings of the present invention;

FIG. 2 is a cross-sectional view taken along line 2—2 in FIG. 1;

FIG. 3 is a top elevational view of a second embodiment of a battery hold-down device constructed in accordance with the teachings of the present invention; and FIG. 4 is a cross-sectional view taken along line 4—4 in FIG. 3.

While the invention has been shown and will be described in some detail with reference to particular, exemplary embodiments thereof, there is no intention that it be limited to such detail. On the contrary, it is intended here to embrace all modifications, alternatives and equivalents falling within the spirit and scope of the invention as defined by the appended claims.

Referring now to the drawing and more specifically to FIGS. 1 and 2, a first embodiment of a battery hold-down device 10 constructed in accordance with the teachings of the present invention is shown. The device includes a substantially flat main body portion 11 which is adapted to engage to top of a battery. For the purpose of cooperating with hold-down bolts on a battery support (not shown) to secure a battery to the battery support, mounting extensions 12a and 12b are provided at opposite ends of the main body portion 11, the extensions being formed integrally with the main body portion. In the exemplary arrangement, the mounting extensions are in the form of downwardly extending members having transverse webs 13a1, 13a2 and 13b1, 13b2 formed therein and having downwardly extending bores 14a and 14b adapted to receive the hold-down bolts. As will be readily apparent, the transverse webs provide for considerable strength when the device is placed under compression.

In accordance with one aspect of the present invention, means are provided for causing the battery hold-down device to be aligned relative to a battery and a battery support. More specifically, a plurality of circular apertures 15a–15f are formed in the main body portion 11 of the device which are adapted to receive upwardly extending bosses or ridges formed coaxially with filler ports in a battery and to receive filler caps inserted in the filler ports. In the exemplary arrangement, the apertures 15a–15f are tapered from the top toward the bottom of the main body portion 11 to receive the bosses or ridges formed coaxially with battery filler ports. While six apertures 15a–15f are disclosed in the exemplary device of FIGS. 1 and 2, it will be readily apparent that the device may be designed to have any desired number of such apertures corresponding in number to the number of filler ports provided in a battery with which the device is to be utilized and the invention is intended to cover the provisions of any desired number of such apertures.

A brief description of a typical mounting operation for a battery may now be helpful. For this purpose, let it be assumed that a battery having six filler ports, corresponding in number to the number of apertures 15a–15f in the exemplary hold-down device of FIGS. 1 and 2, is to be secured in place on a battery support in a selected vehicle. Initially, the battery is positioned in place on the battery support. If filler caps having a flanged head portion are used, the filler caps are then removed from the battery and the hold-down device is positioned across the top of the battery so that the apertures 15a–15f are aligned with the battery filler ports. Conversely, if filler caps having a nonflanged head portion are used, the caps need not be removed since the diameter of the head portions correspond to the diameters of the filler ports and caps are received within the apertures 15a–15f of the hold-down device. It will be apparent that with the latter caps, the caps aid in aligning the hold-down device.

Batteries are generally constructed with upwardly extending bosses or ridges formed coaxially with the filler ports and, with such battery construction, the hold-down device is positioned across the top of the battery so that the bosses are received within the tapered portions of the apertures 15a–15f. As the hold-down device is positioned across the top of the battery in this manner, hold-down bolts on the battery support are extended through the bores 14a and 14b within the mounting extensions 12a and 12b. Nuts are then threaded in place on the hold-down bolts so that the battery is secured in place between the hold-down device and the battery support. Thereafter, if filler caps with flanged head portions are used, the filler caps are inserted through the apertures 15a–15f into the filler ports. In view of the foregoing, it may be seen that the exemplary hold-down device facilitates the securing of a battery in place on a battery support since the hold-down device is readily aligned relative to the battery and thus relative to the battery support.

In accordance with another aspect of the present invention, the battery hold-down device is preferably constructed of a non-corrosive material. The hold-down device may, for example, be constructed of a plastic material such as polypropylene. By using such non-corrosive material, corrosion of the battery support resulting from water and electrolyte on the upper battery surface is eliminated. Consequently, short circuiting resulting from such corrosion is likewise eliminated. Additionally, current leakage to ground is substantially eliminated with such a hold-down device. Further, from an aesthetic standpoint, the hold-down device may be inexpensively made in various basic colors so as to be eye appealing and thereby to make the engine section of the vehicle more eye appealing. Finally, with such material being utilized, identity and textual information may be molded into the hold-down device as it is molded or desired text material may be hot-stamped on the surface of the device. Thus, it may be seen that various practical advantages arise out of employing such materials in the construction of the battery hold-down device.

In accordance with a further aspect of the present invention, means are provided for cooperating with upstanding battery terminals to aid in the alignment of the hold-down device with respect to a battery and for providing additional area upon which textual information may be imprinted. In the exemplary arrangement, an auxiliary lateral extension or tongue 16 is formed integrally with the main body portion 11, at one side thereof, for this purpose. The extension or tongue 16 is adapted to be received between upstanding battery terminals so that the aligning of the hold-down device relative to the battery is aided thereby. Additionally, the extension or tongue 16 provides additional area upon which desired textual information may be hot-stamped or imprinted. From a practical standpoint, the extension or tongue may thereby serve a very useful purpose. For example, installation instructions may be imprinted on the extension 16 to prevent improper installation of the battery in the ignition system of the utilizing vehicle. In vehicles utilizing alternator systems, proper installation of the battery is imperative since reversal of the battery causes diodes in the regulator system of the vehicle to be severely damaged. While the hold-down device shown in FIGS. 1 and 2 is disclosed with a lateral extension 16, it will be readily apparent that the hold-down device may be formed without such an extension and the invention is intended to likewise cover the provision of a hold-down device not having such an extension. Under the latter conditions, the side of the main body portion 11 with which the extension 16 is associated would be terminated along the dotted line 16a shown in FIG. 1.

Referring now to FIGS. 3 and 4, a second embodiment of a hold-down device is shown which is likewise constructed in accordance with the teachings of the present invention. The hold-down device 110 is identical to the hold-down device 10 shown in FIGS. 1 and 2 except for the construction of the mounting extensions 112a and 112b and except for the fact that an auxiliary lateral extension is not provided. Consequently, the hold-down device 110 is provided with a main body portion 111 having a plurality of circular apertures 115a–115f formed therein. The apertures 115a–115f are likewise tapered outwardly from the top to the bottom, as viewed in FIG. 4.

The mounting extension 112a includes a pair of downwardly extending triangular webs 113a1 and 113a2 which are terminated in a transverse bar 113a3. In like manner, the mounting extension 112b includes a pair of downwardly extending triangular webs 113b1 and 113b2 which are terminated in a transverse bar 113b3. For the purpose of receiving hold-down bolts on a battery support, the mounting extensions 112a and 112b are provided with bores 114a and 114b in their top surfaces.

In accordance with still another aspect of the present invention, the hold-down device 110 is designed to allow the mounting extensions 112a and 112b to be folded back over the top of the device. For this purpose, the main body portion 111 is reduced in cross section at points 117a and 117b adjacent the mounting extensions 112a and 112b to form molded hinges (see FIG. 4). Consequently, the mounting extensions 112a and 112b may be folded back about points 117a and 117b into engagement with the top of the main body portion 111 of the hold-down device to make the device more compact.

While the hold-down device 110, as disclosed, does not include an auxiliary lateral extension upon which desired information may be imprinted, it will be readily apparent that the hold-down device may be formed with such an extension. Additionally, it will be readily apparent that the hold-down device 110 may likewise be formed of a non-corrosive material.

What is claimed is:

1. In a battery hold-down device, the combination which comprises a main body portion adapted to engage the top of a battery, mounting extensions connected to opposite ends of the main body portion for cooperating with hold-down bolts on a battery support to secure the battery to the battery support, and a plurality of apertures formed in the main body portion and adapted to be aligned with battery filler ports and to receive battery filler caps so that the device is thereby aligned relative to the battery and the battery support.

2. In a battery hold-down device, the combination which comprises a main body portion formed of a non-corrosive material and adapted to engage the top of a battery, mounting extensions formed integrally with the main body portion at opposite ends thereof for cooperating with hold-down bolts on a battery support to secure the battery to the support, and a plurality of tapered apertures corresponding in number to the number of battery filler ports and adapted to receive bosses formed coaxially with the ports and to receive battery filler caps so that the device is thereby aligned relative to the battery and the battery support.

3. In a battery hold-down device, the combination which comprises a substantially flat main body portion formed of a plastic material and adapted to engage the top of a battery, mounting extensions formed integrally with the main body portion at opposite ends thereof for cooperating with hold-down bolts on a battery support to secure the battery to the support, and a plurality of tapered apertures corresponding in number to the number of battery filler ports and adapted to receive bosses formed coaxially with the ports and to receive battery filler caps so that the device is thereby aligned relative to the battery and the battery support.

4. In a battery hold-down device, the combination which comprises a substantially flat main body portion adapted to engage the top of a battery, mounting extensions formed integrally with the main body portion at opposite ends thereof for cooperating with hold-down bolts on a battery support to secure the battery to the support, the main body portion being of reduced cross section adjacent the extensions to allow the extensions to be folded back on to the top thereof, and a plurality of apertures formed in the main body portion and adapted to be aligned with battery filler ports and to receive battery filler caps so that the device is thereby aligned with the battery and the battery support.

5. In a battery hold-down device, the combination which comprises a main body portion adapted to engage the top of a battery, mounting extensions connected to the main body portion at opposite ends thereof for cooperating with hold-down bolts on a battery support to secure the battery to the support, a plurality of apertures formed in the main body portion adapted to be aligned with battery filler ports and to receive battery filler caps so that the device is thereby aligned with the battery and the battery support, and a lateral extension connected to the main body portion at one side thereof adapted to extend between upstanding battery terminals and to have desired information imprinted thereon.

6. In a battery hold-down device, the combination which comprises a main body portion adapted to engage the top of a battery, mounting extensions formed integrally with the main body portion at opposite ends thereof for cooperating with hold-down bolts on a battery support to secure the battery to the support, a plurality of apertures formed in the main body portion adapted to be aligned with battery filler ports and to receive battery filler caps so that the device is thereby aligned with the battery and the battery support, and a lateral extension formed integrally with the main body portion at one side thereof adapted to extend between upstanding battery terminals and to have desired information imprinted thereon.

7. In a battery hold-down device, the combination which comprises a substantially flat main body portion formed of a non-corrosive material and adapted to engage the top of a battery, mounting extensions at opposite ends of the main body portion for cooperating with hold-down bolts on a battery support to secure the battery to the support, the extensions being downwardly extending members having transverse webs and downwardly extending bores formed therein, and a plurality of tapered apertures corresponding in number to the number of battery filler ports and adapted to receive bosses formed coaxially with the ports and to receive battery filler caps so that the device is thereby aligned relative to the battery and the battery support.

8. In a battery hold-down device, the combination which comprises a substantially flat main body portion formed of a non-corrosive material and adapted to engage the top of a battery, mounting extensions formed integrally with the main body portion at opposite ends thereof for cooperating with hold-down bolts on a battery support to secure the battery to the support, each extension having a substantially flat upper portion with a bore formed therein and a pair of downwardly extending triangular webs terminating in a transverse bar, the main body portion being of reduced cross section adjacent the extensions to form hinges so that the extensions may be pivoted thereabout into engagement with the main body portion, and a plurality of tapered apertures corresponding in number to the number of battery filler ports and adapted to receive bosses formed coaxially with the ports and to receive battery filler caps so that the device is thereby aligned relative to the battery and the battery support.

References Cited by the Examiner

UNITED STATES PATENTS

| 2,621,222 | 12/1952 | Wirth | 180—68.5 X |
| 2,710,660 | 6/1955 | Coleman | 180—68.5 |
| 2,956,101 | 10/1960 | Buhl. | |
| 3,105,567 | 10/1963 | Schultz | 180—68.5 |

MILTON BUCHLER, *Primary Examiner.*

MILTON L. SMITH, *Examiner.*